United States Patent [19]

Drews et al.

[11] Patent Number: 4,474,058
[45] Date of Patent: Oct. 2, 1984

[54] AIR FLOW RATE METER FOR AN INTERNAL COMBUSTION ENGINE

[75] Inventors: Ulrich Drews, Vaihingen-Pulverd; Peter Rapps, Karlsruhe; Karl Staiger, Wannweil; Klaus Streit, Tübingen, all of Fed. Rep. of Germany

[73] Assignee: Robert Bosch GmbH, Stuttgart, Fed. Rep. of Germany

[21] Appl. No.: 348,121

[22] Filed: Feb. 11, 1982

[30] Foreign Application Priority Data

Feb. 21, 1981 [DE] Fed. Rep. of Germany ....... 3106508

[51] Int. Cl.$^3$ .............................................. G01F 1/68
[52] U.S. Cl. ...................................... 73/118.2; 73/204
[58] Field of Search .............................. 73/118 A, 204

[56] References Cited

U.S. PATENT DOCUMENTS

| | | | |
|---|---|---|---|
| 3,363,462 | 1/1968 | Sabin | 73/204 |
| 4,304,128 | 12/1981 | Hafner | 73/204 |
| 4,373,387 | 2/1983 | Nishimura et al. | 73/204 |

FOREIGN PATENT DOCUMENTS 2209413 9/1973 Fed. Rep. of Germany ........ 73/204

Primary Examiner—Herbert Goldstein
Attorney, Agent, or Firm—Edwin E. Greigg

[57] ABSTRACT

An air flow rate meter in an internal combustion engine which functions on the principle of a constant-temperature anemometer is proposed. The device includes a resistance measurement bridge with a regulatable total bridge current, and the relative orientation between the bridge diagonal voltage and the input voltage of a subsequent amplifier is variable. By means of this variation, an adjustment can be made of the set-point and actual curves of the air flow rate meter. In accordance with a first exemplary embodiment, a supplementary current is supplied to one of the connecting lines of the bridge diagonal and the amplifier; in accordance with a second exemplary embodiment, a voltage divider is located between the bridge diagonal points, and one of the voltage divider resistors is connected parallel to an amplifier having a specific offset voltage.

4 Claims, 3 Drawing Figures

AIR FLOW RATE METER FOR AN INTERNAL COMBUSTION ENGINE

BACKGROUND OF THE INVENTION

The invention relates to an air flow rate meter, and in particular to an air flow rate meter for an internal combustion engine which functions as a constant-temperature anemometer. The air flow rate meter of the category of the present invention comprise a resistive measurement bridge circuit, the bridge current flow being controllable in open-loop or closed-loop fashion in accordance with the voltage in the diagonal line of the bridge circuit.

A flow rate meter of this kind is known which has a temperature-dependent resistor in the air intake tube; this resistor is part of a resistor bridge circuit and is regulated in accordance with the bridge circuit diagonal voltage of the total flow of electric current to the bridge.

The output variable of this air flow rate meter is a voltage dependent on the air throughput kg/sec in the intake tube of the engine; at a throughput variation of from 1 to 40, this voltage varies only by approximately 1 to 3. Given this relatively undynamic behavior of the system, it is necessary for the air flow rate meter to be adjusted with the utmost precision to a set-point curve. In the known air flow rate meter, this is attained by adjusting a bridge resistor at one point to the set-point value. Because of the tolerances of the electronic and mechanical components, however, the actual curve deviates from the set-point curve outside the adjustment point.

FIG. 1 shows the output signal $U_M$ of an air flow rate meter functioning as a constant-temperature anemometer in accordance with the prior art, plotted over the air throughput ṁ. A set point characteristic curve 10, corresponding to set-point voltage $U_S$, and an actual characteristic curve 11, corresponding to an actual voltage $U_A$ are shown. The two curves intersect at an adjustment point 12, and it is apparent that the maximum precision of the meter can be attained only at a single point on the curve.

OBJECT AND SUMMARY OF THE INVENTION

It is an object of the present invention to provide an air flow rate meter of the category noted above in which the set-point voltage curve and actual value voltage curve substantially coincide.

This object is achieved by an air flow rate meter comprising a resistive measurement bridge circuit having an amplifier in the diagonal line of the bridge circuit and the capability of varying the voltage in the diagonal line of the bridge circuit on the input side of the amplifier.

The air flow rate meter according to the present invention has the advantage over the prior art in that the actual voltage value curve, over its entire course, approaches very close to the set-point voltage value curve. This assures very great precision in the air flow rate meter and accordingly assures that the resulting measurement will be extremely exact.

The meter according to the present invention also contributes to assuring the stability of the regulating circuit. A resistor-capacitor member previously required, although it impaired the dynamics of the system, can thus be eliminated.

The invention will be better understood and further objects and advantages thereof will become more apparent from the ensuing detailed description of preferred embodiments taken in conjunction with the drawings.

DESCRIPTION OF THE PREFERRED EMBODIMENTS

The exemplary embodiments relate to air flow rate meters in internal combustion engines; the type of engine, whether Diesel or Otto, is unimportant.

Figure 1:
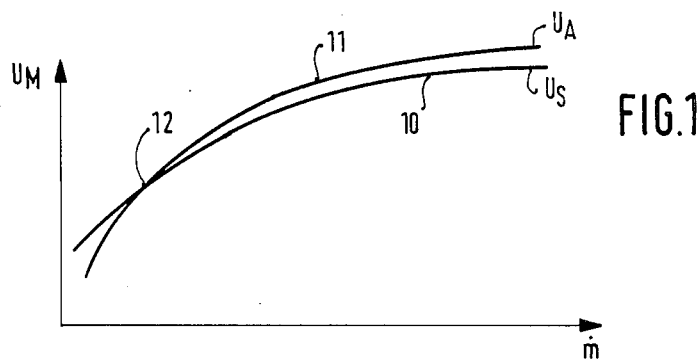
FIG. 1 shows the characteristic curve of an air flow rate meter functioning on the principle of a constant-temperature anemometer.

The point of intersection of the two curves shown in FIG. 1 illustrates the possibility of having the two curves virtually coincide by performing a rotation. This can be attained in view of the non-linearity of the anemometer and by means of the two exemplary embodiments of the present invention, which will now be described in greater detail.

Figure 2:
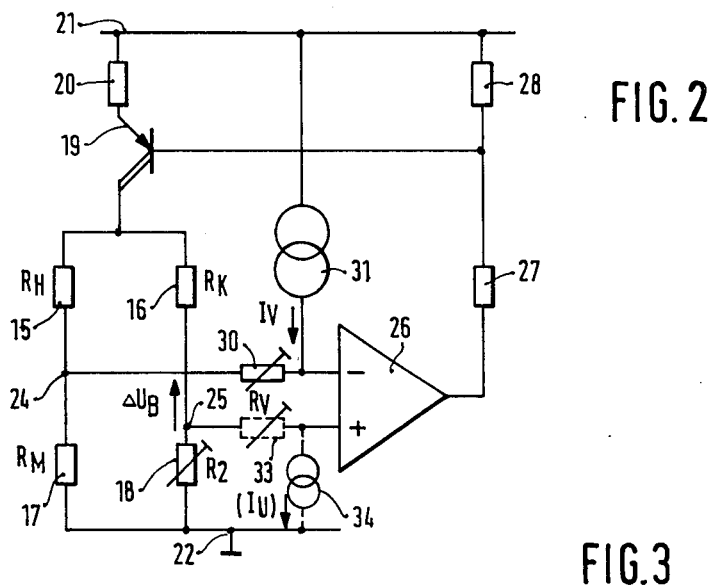
FIG. 2 shows a first exemplary embodiment of an air flow rate meter according to the invention.

FIG. 2 shows an air flow rate meter, known in principle and functioning as a constant-temperature anemometer, which has been modified in accordance with the invention. The actual measurement bridge comprises four resistors 15–18. A power transistor 19 and a resistor 20 are disposed in series with the measurement bridge between two operating-voltage lines 21 and 22. The bridge diagonal points 24 and 25 are connected to the inputs of an amplifier 26, whose output in turn is coupled with the base of the transistor 19, via a voltage divider comprising two resistors 27 and 28.

In the connecting line from the bridge diagonal point 24 to the inverting input of the amplifier 26, there is included an adjustable resistor 30. A current source 31 is incorporated between the positive line 21 and the junction point of the resistor 30 and the amplifier 26.

Broken lines in FIG. 2 indicate an addition or an alternative embodiment to the resistor 30 and current source 31. This alternative, disposed in mirror symmetry to the resistor 30 and current source 31, includes a resistor 33 and current source 34 in and from the connecting line from the diagonal point 25 to the amplifier 26 and the ground line 22.

With the bridge diagonal configuration of FIG. 2, only bridge diagonal voltages $\Delta U_B$ with a specific algebraic sign can be generated. In particular with the current source 31 connected to the positive line 21 a current $I_V$ flows as shown. To obtain a reverse current flow, the current source 31 would have to be connected to the ground terminal 22 instead of to the positive line 21.

The current $I_V$ flowing from the constant-current source 31 creates a voltage drop at the resistor 30; as a consequence, the voltage $\Delta U_B$ appears at the bridge diagonal between points 24 and 25. This voltage can be brought to the desired value via the resistance value of the resistor 30.

The corresponding process also takes place if the current source 34 is used in combination with the resistor 33.

For the exemplary embodiment of FIG. 2, it has been demonstrated that the regulating stability is increased if $\Delta U_B$ always has the algebraic sign shown in FIG. 2, that is, if the potential at the diagonal point 25 is more positive than that at the diagonal point 24. In contrast, a device which generates a $\Delta U_B$ with the opposite algebraic sign has a destabilizing effect, which necessitates the introduction of additional compensating members.

Figure 3:
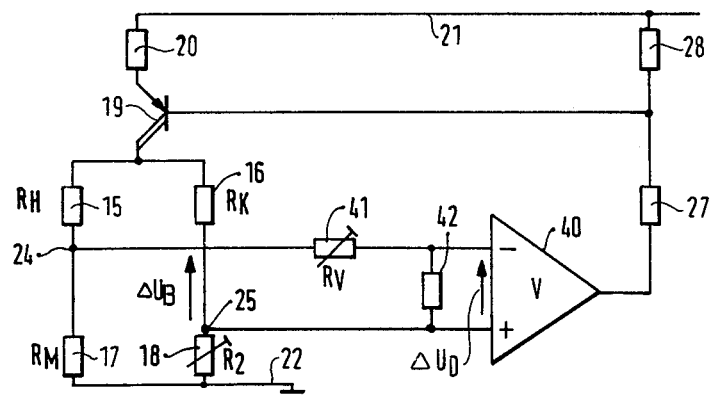
FIG. 3 shows a second exemplary embodiment of an air flow rate meter according to the invention.

The second exemplary embodiment of FIG. 3 includes an amplifier 40 whose offset voltage has a definite value $\Delta U_D$ not equal to zero of the amplifier 40 is used in order to stabilize the regulating device at the beginning of the measurement. In a known component, for example, this offset voltage is adjusted to 5 mV.

The second embodiment differs from the basic arrangement shown in FIG. 2 in the following details: The two bridge diagonal points 24 and 25 are connected via a series circuit of two resistors 41 and 42; the input terminals of the amplifier 40 are located parallel to the resistor 42. In this case, the bridge diagonal voltage $\Delta U_D$ can be set by having the resistance values of at least one of the two resistors 41 and 42 adjustable.

The air flow rate meters described above enable the precise ascertainment of the air flow rate through the air intake tube of an internal combustion engine, thus permitting a precise adjustment of the fuel quantity to be metered or, for instance, of a desired exhaust gas quantity.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In an air flow rate meter for an internal combustion engine, functioning on the principle of a constant-temperature anemometer, including a resistance measurement bridge circuit and an amplifier connected in the diagonal line of the bridge circuit, the improvement comprising:

means for varying the voltage in the diagonal line of the bridge circuit connected with an input to the amplifier.

wherein the means for varying the voltage in the diagonal line of the bridge circuit includes a pair of resistors defining a voltage divider connected in the diagonal line of the bridge circuit on the input side of the amplifier, and wherein the input terminals of the amplifier are arranged parallel to one of the resistors of the voltage divider, and wherein the bridge current flow is controllable in accordance with the bridge diagonal voltage.

2. In the air flow rate meter as defined in claim 1 wherein one end of the diagonal line of the bridge circuit is connected to the inverting input of the amplifier and the other end of the diagonal line of the bridge circuit is connected to the non-inverting input of the amplifier, and wherein the end connected to the non-inverting input is at a higher potential than the end connected to the inverting input.

3. An air flow rate meter device for an internal combustion engine having at least one measuring resistor exposed to flowing air and disposed in a measurement bridge and exhibiting set-point voltage values and actual voltage values reflecting the quantity of air flow, an amplifier connected to the two bridge diagonal points, the output signal of which regulates the current flowing through the measurement bridge, comprising:

a means applying an additional voltage to at least one of the two inputs of the amplifier, for effecting at least one of:
  (i) a virtual coincidence of the set-point values and the actual values, and
  (ii) reducing the fluctuations of the regulating circuit, and wherein the means applying the voltage in the diagonal line of the bridge circuit includes a pair of resistors defining a voltage divider connected in the diagonal line of the bridge circuit on the input side of the amplifier, and wherein the input terminals of the amplifier are arranged parallel to one of the resistors of the voltage divider.

4. In the air flow rate meter as defined in claim 3, wherein one of the resistors of the voltage divider is variable.

* * * * *